United States Patent
Park et al.

(10) Patent No.: US 7,075,085 B2
(45) Date of Patent: Jul. 11, 2006

(54) METHOD OF MEASURING THICKNESS OF THIN FILM USING INFRARED THERMAL IMAGING SYSTEM

(75) Inventors: Il-Seok Park, Ulsan-Si (KR); Sang-Min Park, Ulsan-Si (KR)

(73) Assignee: Hyundai Heavy Industries Co., Ltd., Ulsan-Si (KR)

(*) Notice: Subject to any disclaimer, the term of this patent is extended or adjusted under 35 U.S.C. 154(b) by 62 days.

(21) Appl. No.: 10/869,903

(22) Filed: Jun. 18, 2004

(65) Prior Publication Data
US 2005/0263706 A1 Dec. 1, 2005

(30) Foreign Application Priority Data
May 25, 2004 (KR) ............ 10-2004-0037295

(51) Int. Cl.
*G01J 5/02* (2006.01)
(52) U.S. Cl. ............................ 250/341.6
(58) Field of Classification Search ........ 250/341.6
See application file for complete search history.

(56) References Cited

U.S. PATENT DOCUMENTS 4,634,291 A * 1/1987 Bantel et al. .......... 374/7
5,091,647 A * 2/1992 Carduner et al. ...... 250/339.09

* cited by examiner

*Primary Examiner*—David Porta
*Assistant Examiner*—Marcus Taningco
(74) *Attorney, Agent, or Firm*—Arent Fox PLLC (57) ABSTRACT

The present invention relates to a method of measuring the thickness of a thin film layer using an infrared thermal imaging system. The object of the present invention is to provide a method of measuring the thickness of a thin film layer fast in such a way as to obtain the two-dimensional (2-D) thickness distribution of the thin film layer at one time by measuring infrared spontaneous light emitted from a target surface using an infrared imaging camera. The present invention includes a means for measuring the thickness of a thin film coated on a flat base surface, which outputs the thickness of the thin film layer based on the emissivity of the base surface and the coating layer and the intensity of the infrared spontaneous light that is measured on the flat target surface and converted into temperature, and a means for measuring the thickness of a thin film layer coated on a curved base surface, which outputs the thickness of the thin film layer while considering directional emissivity attributable to the materials of the base surface and the coating layer.

5 Claims, 6 Drawing Sheets

METHOD OF MEASURING THICKNESS OF THIN FILM USING INFRARED THERMAL IMAGING SYSTEM

BACKGROUND OF THE INVENTION

1. Field of the Invention

The present invention relates generally to a method of measuring the thickness of a thin film layer using an infrared thermal imaging system and, more particularly, to a method of measuring the thickness of a thin film layer using infrared radiation spontaneously emitted from a target surface instead of using reflected light, which two-dimensionally measures the thickness of the thin film of a coating layer using an infrared thermal imaging system.

2. Description of the Related Art

Coating is frequently used to protect a surface or to strengthen the function of the surface. The thickness of a coating trends toward a decrease so as to increase the economical efficiency of the coating. As the thickness of the coating becomes thinner, it is important to make the thickness of the coating uniform. For this purpose, it is required to measure the thickness of the coating.

For a conventional method of measuring the thickness of a thin film layer, point measurement using supersonic waves or an optical method has been mainly used. However, a method of measuring the distribution of the thickness of a thin film on a coated surface using the point measurement is problematic in that the method is just a sample test on the coated surface, and it is difficult to use the method of quickly detecting the distribution of the thickness because it takes a long time to measure the thickness. To solve the above-described problems, an optical measuring method has started to be used as a method of obtaining two-dimensional (2-D) thickness distribution at one time even though its accuracy is deteriorated compared to the point measurement. The conventional 2-D thin film thickness measuring method is designed to measure the thickness of a thin film in such a way that a measurement instrument emits a radiant ray (light) and measures reflected light, and the thickness of the thin film is measured using the deviation of reflexibility on a coated surface. However, the method is problematic in that a narrow-band filter is required because the method is weak with light reflected from the surroundings, a light source is required to emit the radiant ray, and the reflected light is required to be normalized with respect to the intensity of the emitted light because the distribution of the light emitted to a target surface is not uniform. Furthermore, the method is problematic in that the intensity of the reflected light considerably varies with the angle of the target surface.

SUMMARY OF THE INVENTION

Accordingly, the present invention has been made keeping in mind the above problems occurring in the prior art, and an object of the present invention is to provide a method of measuring the thickness of a thin film layer fast in such a way as to obtain the 2-D thickness distribution of the thin film layer at one time by measuring infrared spontaneous light emitted from a target surface using an infrared thermal imaging camera.

The present invention is constructed to measure the 2-D thickness distribution of the thin film layer by measuring the intensity of the infrared spontaneous light emitted from the target surface instead of reflected light using the infrared thermal imaging camera, and then measure the thickness of the thin film layer based on the above-measured thickness distribution.

All solid surfaces emit infrared rays whose intensity is determined based on the emissivity and temperature thereof. However, a naked surface to be coated has specific emissivity based on the material thereof, and a coating layer semitransparent to the infrared rays has emissivity that is determined based on the material and thickness thereof. That is, the base surface and the coating layer have different emissivity. Furthermore, since radiant rays have intensity that is changed while passing through the coating layer by the absorption and transmission of the coating layer, the thickness of the coating layer can be detected by measuring the intensity of the radiant rays. In this case, if the common infrared thermal imaging camera is used as a measurement apparatus, the 2-D image of the intensity of the infrared rays emitted from the target surface can be obtained, so that 2-D thickness distribution can be obtained at one time.

The present invention is constructed to measure the thickness of the thin film layer using the above-described principle, and provided with a means for measuring the thickness of a thin film coated on a flat base surface, which outputs the thickness of the thin film layer based on the emissivity of the base surface and the coating layer and the intensity of the infrared spontaneous light that is measured on the flat target surface and converted into temperature, and a means for measuring the thickness of a thin film layer coated on a curved base surface, which outputs the thickness of the thin film layer while considering directional emissivity attributable to the materials of the base surface and the coating layer.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

The present invention is described in detail with reference to the attached drawings below.

Figure 1:
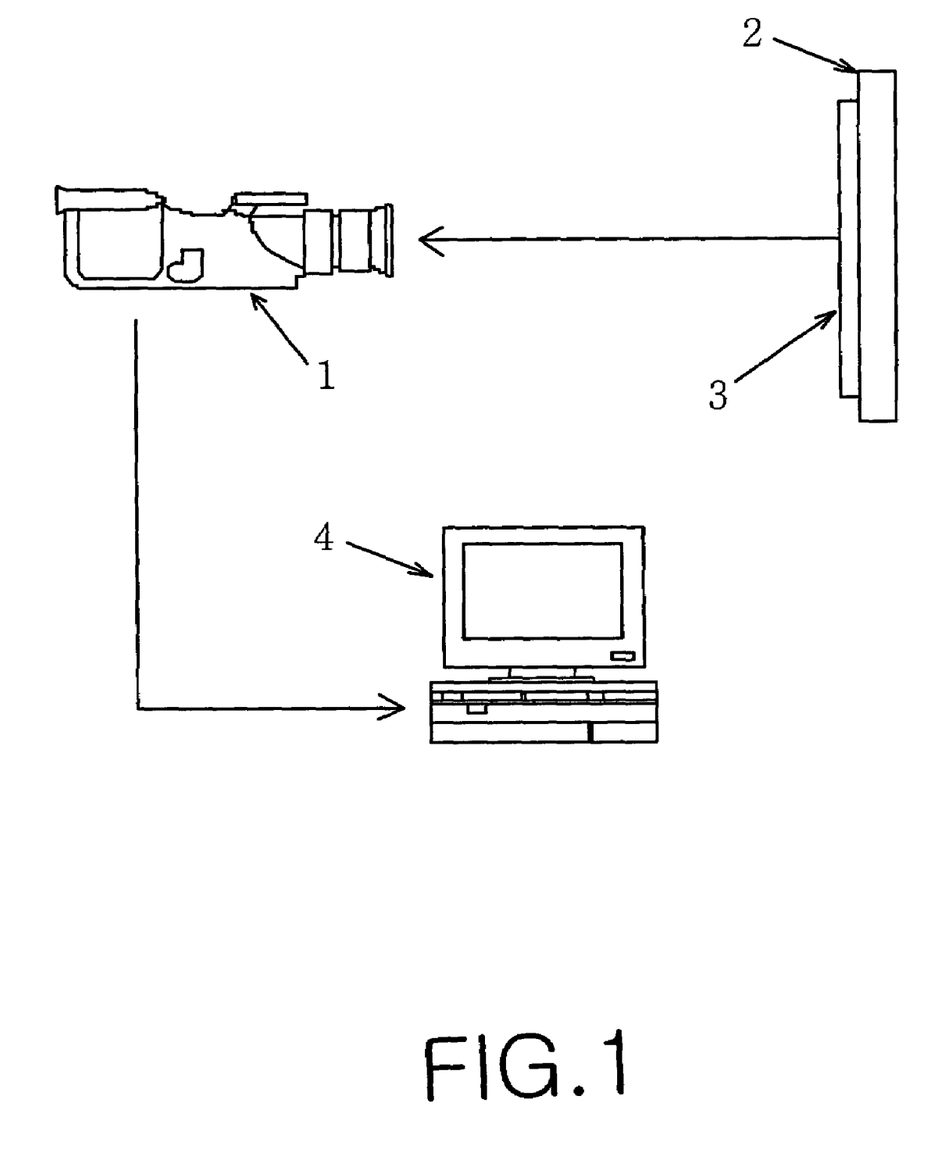
FIG. 1 is a view showing an example of a measuring method according to the present invention.

FIG. 1 is a view showing an example of a measuring method according to the present invention. The diagram illustrates an infrared imaging camera 1 for measuring infrared rays emitted from a target surface 2 that is covered with a thin film layer 3, and a computer 4 for operating a program that converts a 2-D infrared image obtained from the measurement of the infrared rays into thickness distribution.

Figure 2:
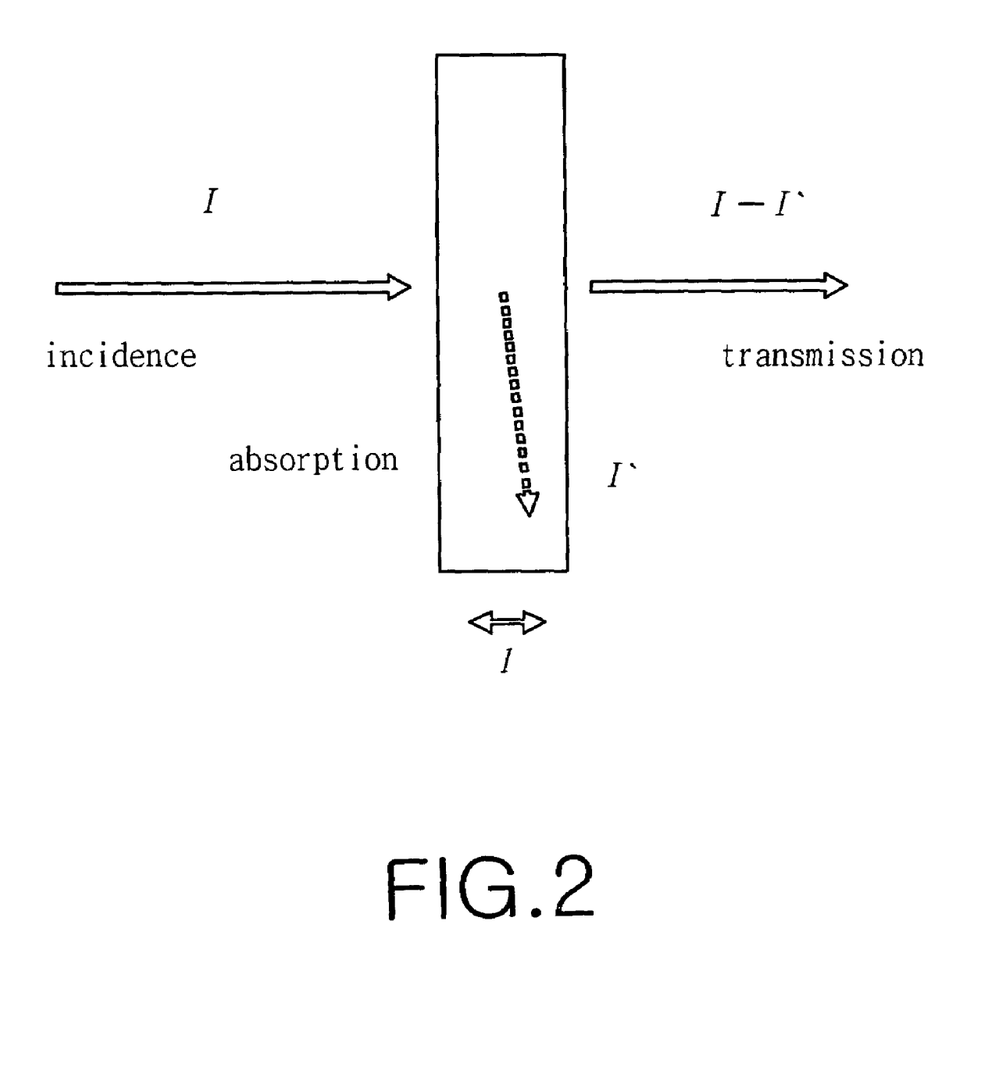
FIG. 2 is a view showing the principle on which infrared rays are transmitted through and absorbed into a thin film.

FIG. 2 is a view showing the principle on which infrared rays are transmitted through and absorbed into the thin film layer. If it is assumed that the absorption of the layer is I', incident light having intensity I will have intensity I–I' after passing through the layer having thickness l. In this case, the absorption I' increases depending on the thickness l of the layer. Meanwhile, the layer itself emits a radiant ray, and the intensity of the radiant ray is proportional to the thickness of the layer. Finally, a value measured by the infrared thermal imaging camera is the total amount of light transmitted through the thin film layer and emitted from the thin film layer. Since the value varies with the thickness of the thin film layer, the thickness can be measured from the intensity of the infrared ray.

Figure 3:
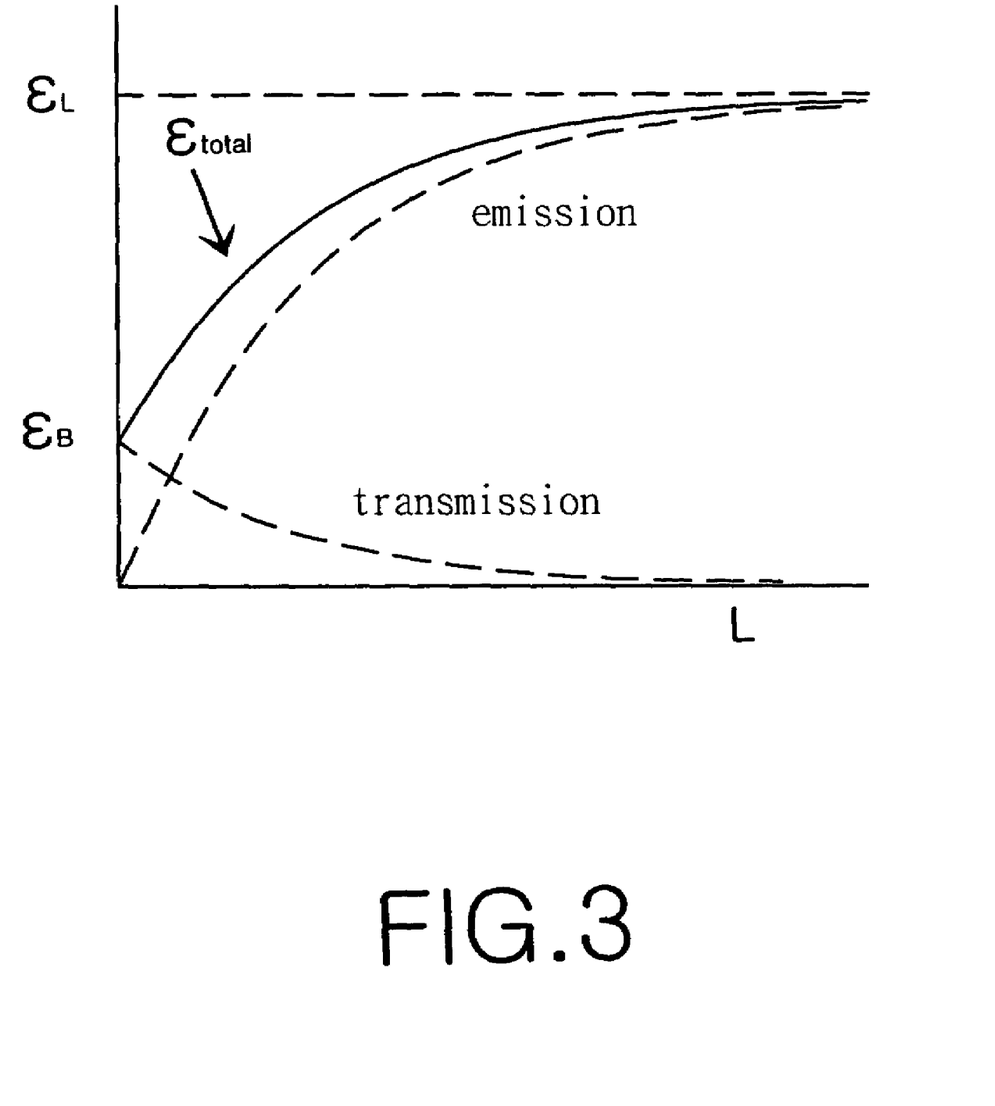
FIG. 3 is a graph showing an example of the relationship between emissivity and the thickness of a layer.

FIG. 3 is a graph showing an example of the relationship between emissivity and the thickness of a layer. Dotted lines show the emissivity of the radiant ray transmitted from a base surface through the thin film layer and the emissivity of the radiant ray spontaneously emitted from the thin film layer, respectively, and a solid line shows total emissivity $\epsilon_{total}$ obtained by the sum of the two emissivity. $\epsilon_B$ indicates the emissivity of a naked surface without a thin film layer, and $\epsilon_L$ indicates the emissivity of a film surface in the case where the thin film layer is opaque because the thickness of the thin film layer is sufficiently large. The total emissivity $\epsilon_{total}$ has a value that varies with the thickness of the thin film layer within the range from the emissivity $\epsilon_B$ to the emissivity $\epsilon_L$. It is possible to quantitatively measure the intensity of radiant rays and the thickness of a thin film layer, which are calculated from the relationship between the transmission through and absorption of the radiant rays of the thin film layer. Furthermore, it is possible to quantitatively measure the thickness of the thin film layer from the intensity of the radiant rays using an interpolation method that uses actually measured data.

The present invention is constructed to measure the intensity of the infrared spontaneous light emitted from the target surface using the infrared thermal imaging camera, and then measure the thickness of a flat or curved thin film layer based on the above-measured intensity of the infrared spontaneous light.

Measurement of Thickness of Flat Thin Film Layer

A graph can be prepared showing an example of the relationship between represented temperature and the thickness of a layer. It can be understood that the represented temperature considerably varies with the variation of thickness in the case where the thickness of a layer is thin and this causes the thickness of thin film layers to be easily distinguished.

An example of an infrared image measured on a target surface nonuniformly coated with a thin film layer can be made, that is, a surface on which a think film layer is irregularly formed. The target surface is heated to 125° C. In this case, the bright points of the infrared image would indicate that the thickness of the thin film layer on the points is large, and the dark points thereof would indicate that the thickness of the thin film layer on the points is small. It can be understood that irregular patterns are shown due to the nonuniform thickness of the thin film layer.

A graph can be prepared showing an example of thickness distribution obtained from the measured infrared image. The horizontal axis of the graph would indicate relative thickness, and the vertical axis thereof would indicate the number of pixels. It can be understood that the thickness of the thin film layer of the target surface is nonuniform from a fact that the thickness distribution is wide.

The present invention using the above-described principle includes the steps of measuring infrared spontaneous light emitted from a target surface using an infrared thermal imaging camera, calculating the actual emissivity $\epsilon_{actual}$ of the target surface using the ratio of the real temperature $T_{real}$ of the target surface actually measured using a thermocouple wire to the temperature $T_{IR}$ measured by the infrared camera, and measuring the thickness of the thin film layer using the calculated actual emissivity $\epsilon_{actual}$, emissivity $\epsilon_B$ that is a physical property of the naked surface, and the relationship between the thickness of the thin film layer and the variation of the total emissivity.

The infrared thermal imaging camera 1 used in the present invention is commonly used to convert the intensity of an emitted infrared ray into temperature, and display and output the temperature under the assumption that the emissivity of a target surface is uniform. However, in the present invention, a difference in the intensity of the infrared rays is based on the difference in the actual emissivity that is attributable to thickness in the thin film coated on the target surface having uniform temperature. Accordingly, the actual emissivity $\epsilon_{actual}$ should be calculated (in this case, it can be assumed that the temperature of the target surface is almost identical with that of the thin film layer because the film layer is thin).

The reason why the temperature $T_{IR}$ of the target surface, which is obtained by measuring the intensity of the infrared spontaneous light emitted from the target surface 2 using the infrared thermal imaging camera 1 and converting the intensity into temperature, has a value different from the real temperature $T_{real}$ of the thin film layer and the naked surface, which are actually measured using a thermocouple wire, is that the emissivity $\epsilon_{set}$ of the target surface to be photographed, which is previously set on the infrared thermal imaging camera 1, is different from the actual emissivity $\epsilon_{actual}$ of the target surface. In practice, even though an infrared ray having actual emissivity and real temperature is emitted, its intensity $\epsilon_{actual}\sigma T_{real}^4$ has a value identical with that of the intensity $\epsilon_{set}\sigma T_{IR}^4$ that is calculated using emissivity previously set on the camera and temerature measured by the camera. Accordingly, the actual emissivity $\epsilon_{actual}$ of the target surface is expressed as Equation 1 below.

$$\varepsilon_{actual} = \left(\frac{T_{IR}}{T_{real}}\right)^4 \varepsilon_{set} \tag{1}$$

The actual emissivity $\epsilon_{actual}$ is obtained using Equation 1, and the obtained emissivity $\epsilon_{actual}$ corresponds to the total emissitivity $\epsilon_{total}$ of FIG. 3.

Furthermore, the 2-D thickness distribution of the thin film layer is obtained in such a way that the infrared spontaneous light emitted from the target surface 2 is measured using the infrared thermal imaging camera 1, a 2-D image is obtained, the light of each pixel is read from the obtained 2-D image, the light of the pixel is converted into a thickness. In this case, the thickness of the thin film layer is larger as the light of the pixel is lightened, and the thickness of the thin film layer is smaller as the light of the pixel is darkened. As described above, since the method inspects only the uniformity of the image, the method can be applied to the uniformity inspection of the thickness of the thin film layer without a process of quantitatively measuring the thickness of the thin film layer.

Measurement of Thickness of Curved Thin Film Layer

Most objects do not have a characteristic of uniformly emitting radiant rays in all directions such as in a black body, but have a directional radiation characteristic in which emissivity and the intensity of the radiant rays are different depending on directions. Furthermore, the distribution of the directional emissivity is considerably different depending on materials. In particularly, the tendency of an electrical conductor is considerably different from that of an insulator. Accordingly, in the present invention, it is possible to accurately measure the thickness of a thin film coated on a curved surface while considering the distribution of the directional emissivity of a material attributable to angles formed by the normal lines of the lens of an infrared thermal imaging system and the normal lines of locations to be measured.

The present invention is designed to accurately measure the thickness of a thin film coated on a curved surface by applying different directional emissivity depending on the material of a base surface and the material of the thin film, in addition to the principle in which the infrared rays are separated into spontaneous light emitted from the base surface and a film surface, which is applied to the above-described flat thin film layer. That is, the method of measuring the thickness of the thin film coated on the curved surface according to the present invention is performed in such a way that the total intensity $\epsilon_{actual}\sigma T^4$ of the infrared spontaneous light emitted from the target curved surface is measured by an infrared thermal imaging camera, the intensity $\epsilon_f \sigma T^4$ of the spontaneous light emitted from the film surface is multiplied by the directional emissivity attributable to the material of the film surface, the intensity $\epsilon_t \epsilon_B \sigma T^4$ of the spontaneous light emitted from the base surface is multiplied by the directional emissivity attributable to the material of the base surface, the intensity $\epsilon_t \epsilon_B \sigma T^4$ and $\epsilon_f \sigma T^4$ of the spontaneous light is summed to calculate the total intensity of the infrared spontaneous light, and the thickness of the thin film coated on the curved base surface can be measured using the variation of the total emissivity depending on the thickness of the thin film through the measured value and the calculated value.

Generally, since the base surface and the thin film are tightly attached to each other, it can be assumed that they have the same temperature. However, the emissivity thereof is obviously different from each other. The radiant rays measured by the infrared camera are the total amount of some of spontaneous light emitted from a corresponding base surface and transmitted through the thin film layer, and light spontaneously emitted from the thin film layer. However, the infrared camera detects that the radiant rays simultaneously emitted from the two objects are emitted from one object, so that the intensity of the radiant rays measured by the infrared camera are expressed as Equation 2.

$$\epsilon_{actual}\sigma T^4 = \epsilon_t \epsilon_B \sigma T^4 + \epsilon_f \sigma T^4 \quad (2)$$

where T, $\sigma$, $\epsilon_{actual}$, $\epsilon_t$ and $\epsilon_f$ indicate a temperature, a Stefan-Boltzman constant, actual emissivity in the case where the radiant rays emitted from two objects are detected as being emitted from one object, the transmissivity of the radiant ray emitted from the base surface, and the emissivity of the coating thin film layer, respectively.

The emissivity $\epsilon_t$ and $\epsilon_f$ are depending on thickness as shown in FIG. 3, and thickness corresponding a combination of the intensity $\epsilon_t$ and $\epsilon_f$, to which the intensity $\epsilon_{actual}\sigma T^4$ of the total radiant rays measured by the infrared camera are properly distributed depending on the contribution of the radiant rays emitted from the two objects, can be found.

Figure 4:
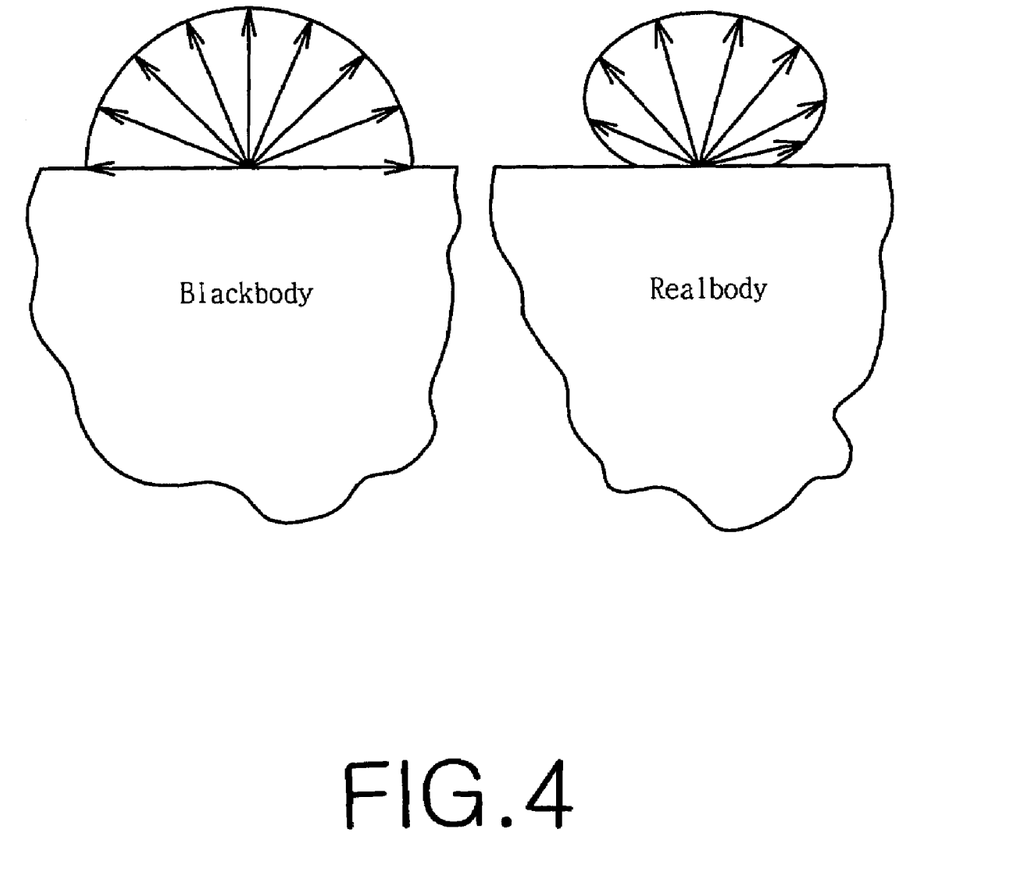
FIG. 4 is a view showing an example of the directional radiation characteristic of black and real bodies.
Figure 5:
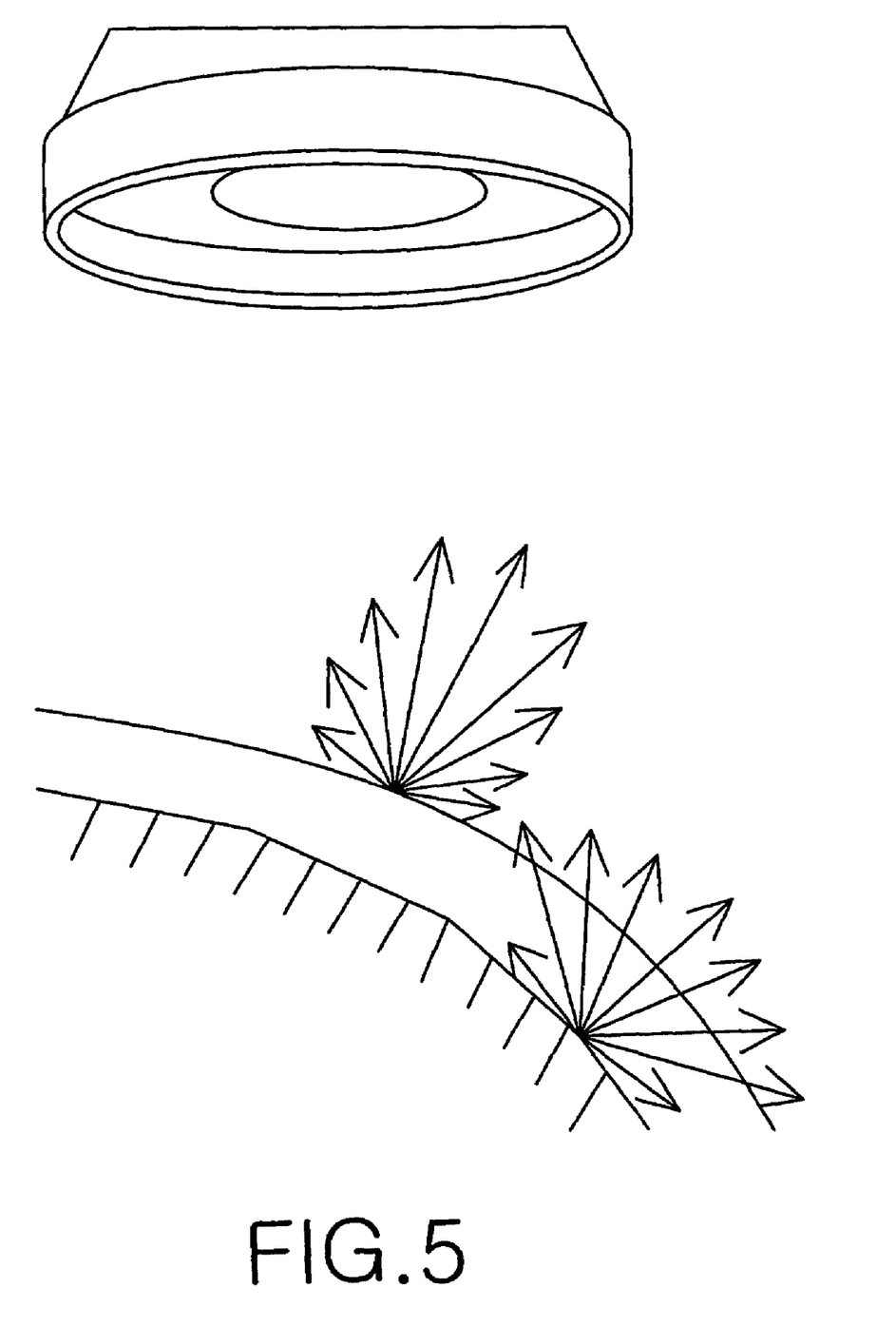
FIG. 5 is a view showing an example of the intensity of the radiant rays that is detected by a camera due to the directional radiation characteristic.
Figure 6:
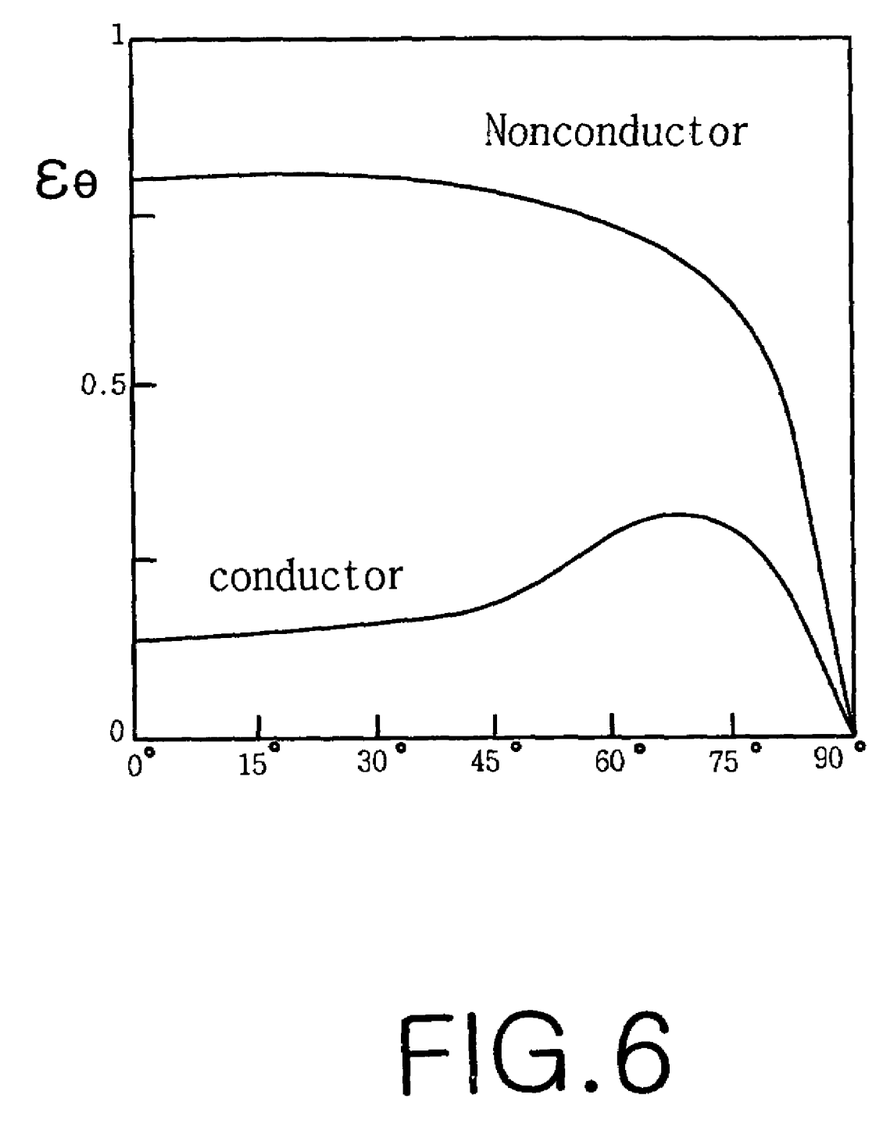
FIG. 6 is a view showing an example of the directional radiation characteristic of a conductor and an insulator.

FIG. 4 is a view showing an example of the directional radiation characteristics of black and real bodies. FIG. 5 is a view showing an example of the intensity of the radiant rays that is captured by a camera due to the directional radiation characteristics of FIG. 4. FIG. 6 is a view showing an example of the directional radiation characteristics of a conductor and an insulator. Generally, all objects, which are not perfect black bodies, have the directional radiation characteristic as shown in FIG. 4 so that the intensity of the radiant rays captured by the fixed infrared camera is affected by angles as shown in FIG. 5. Furthermore, as shown in FIG. 6, an electric insulator shows a diffusion radiation characteristic in which the electric insulator is hardly affected by a direction at angles up to 60°, and a conductor definitely shows the directional radiation characteristics at angles of 45° and above. Accordingly, the thickness of the curved surface can be more accurately measured through the following Equation 3 that is obtained by multiplying the terms on the right side of Equation 2 by directional emissivity attributable to the materials of corresponding film and base surfaces, $$\epsilon_{actual}\sigma T^4 = \alpha \epsilon_t \epsilon_B \sigma T^4 + \beta \epsilon_f \sigma T^4 \quad (3)$$

where, $\alpha$ and $\beta$ indicate the directional emissivity of the base surface and the film surface, respectively.

When the thickness of the thin film coated on a flat/curved surface is measured using the infrared spontaneous light as described above, infrared rays generated from the surroundings are reflected by the base surface 2 and the generated infrared rays cause noise to a signal, so that a signal to noise ratio is decreased. In this case, for a method of increasing the signal to noise ratio, a method of heating the base surface 2 can be used. Since the intensity of the radiant rays is proportional to the emissivity and the $4^{th}$ power of absolute temperature, it can be ignored that the infrared rays from the surroundings are reflected if the intensity of the radiation rays increases the $4^{th}$ power.

As described above, the present invention employs the method of obtaining the 2-D thickness distribution of the thin film layer by measuring infrared spontaneous light from a target surface using an infrared thermal imaging camera, so that the 2-D distribution can be obtained at one time, which can be obtained by repeating point measurement requiring a plenty of time.

Furthermore, the present invention uses infrared spontaneous light, so that a separate light source is not required. Accordingly, the construction of a relevant apparatus is simplified and a separate apparatus is not required for solving errors occurring due to the nonuniformity of the irradiating light, thus simplifying the construction of a measurement system compared to a method of using reflection used in conventional 2-D thickness distribution.

Furthermore, the present invention is effective in that the thickness of a curved surface whose curvature is considerably changed can be accurately measured using one fixed camera apparatus while considering the directional radiation characteristic attributable to the material of an object to be measured.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of measuring a thickness of a thin film layer using an infrared thermal imaging system, comprising:
   measuring two-dimensional (2-D) thickness distribution of the thin film layer using infrared radiation spontaneously emitted from a total target surface to be measured; and
   calculating the thickness of the thin film layer coated on a flat or curved surface based on the measured thickness distribution.

2. A method of measuring a thickness of a thin film layer using an infrared thermal imaging system, comprising:
   measuring two-dimensional (2-D) thickness distribution of the thin film layer using infrared radiation spontaneously emitted from a total target surface to be measured;
   calculating the thickness of the thin film layer coated on a flat or curved surface based on the measured thickness distribution by:
      measuring the infrared spontaneous light emitted from the target surface using the infrared thermal imaging camera;
      converting intensity of the infrared spontaneous light into temperature (T_A) using a computer;
      calculating total emissivity $\epsilon_{total}$ using the temperature (T_A), emissivity (epsilon B) of a surface without the thin film layer and temperature (T_B) of the surface without the thin film layer; and
      measuring the thickness of the thin film layer using a variation of the total emissivity $\epsilon_{total}$ that varies with the thickness of the thin film layer.

3. A method of measuring a thickness of a thin film layer using an infrared thermal imaging system, comprising:
   measuring two-dimensional (2-D) thickness distribution of the thin film layer using infrared radiation spontaneously emitted from a total target surface to be measured;
   calculating the thickness of the thin film layer coated on a flat or curved surface based on the measured thickness distribution by:
      measuring total intensity $\epsilon_{realistic}\sigma T^4$ of the infrared spontaneous light emitted from the flat or curved surface using the infrared thermal imaging camera;
      multiplying intensity of spontaneous light so $\epsilon_f \sigma T^4$ emitted from a coating thin film surface by directional emissivity that is attributable to the material of the coating thin film, multiplying the intensity of spontaneous light $\epsilon_t \epsilon_B \sigma T^4$ emitted from the target surface by directional emissivity that is attributable to the material of the target surface, and calculating the intensity of the total infrared spontaneous light by summing up the above multiplication results, as shown in the following equation; and
      measuring the thickness of the thin film layer coated on the curved surface using a variation of the total emissivity that varies with the thickness of the thin film layer, through the measured value and calculated value $$\epsilon_{actual}\sigma T^4 = \alpha\epsilon_t \epsilon B \sigma T^4 + \beta\epsilon_f \sigma T^4 \qquad (3)$$

where T, $\sigma$, $\epsilon_{actual}$, $\epsilon_t$, $\epsilon_f$, $\alpha$ and $\beta$ indicate a temperature, a Stefan-Boltzman constant, actual emissivity in the case where the radiant rays emitted from two objects are detected that the radiant rays emitted from one object, transmissivity of the radiant ray emitted from the base surface, emissivity of the coating thin film layer, a directional emissivity ratio on the coated thin film, and a directional emissivity ratio on the coating thin film layer, respectively.

4. The method as set forth in one of claims 1 to 3, wherein the measuring of the 2-D thickness distribution of the thin film layer comprises:
   measuring the infrared spontaneous light emitted from the target surface using the infrared thermal imaging camera and obtaining a 2-D image;
   reading light of respective pixels from the 2-D image and converting the light into thickness; and
   representing a number of pixels with respect to each thickness.

5. The method as set forth in one of claims 1 to 3, further comprising increasing a signal to noise ratio by heating the target surface.

* * * * *